United States Patent [19]

Adams

[11] Patent Number: 4,606,517
[45] Date of Patent: Aug. 19, 1986

[54] STORE ADAPTER

[75] Inventor: Arthur E. Adams, Culver City, Calif.

[73] Assignee: Northrop Corporation, Los Angeles, Calif.

[21] Appl. No.: 560,685

[22] Filed: Dec. 12, 1983

[51] Int. Cl.[4] .............................................. B64D 1/06
[52] U.S. Cl. ................................. 244/137 A; 89/1.59; 294/82.26; 294/82.32
[58] Field of Search ............ 244/137 R, 137 A, 118.1; 294/83 R, 83 AE, 83 AB, 116, 81 R, 81 SF, 92, 96, 82.26, 82.32; 89/1.5

[56] References Cited

U.S. PATENT DOCUMENTS

| | | | |
|---|---|---|---|
| 3,493,258 | 2/1970 | Wyrough | 294/81 SF |
| 3,799,478 | 3/1974 | Costes et al. | 244/137 A |
| 3,810,671 | 5/1974 | Jeffery | 294/83 R |
| 3,883,097 | 5/1975 | Billot | 244/137 A |
| 4,056,248 | 11/1977 | Hasquenoph et al. | 244/137 A |
| 4,102,520 | 7/1978 | Hasquenoph et al. | 244/137 A |

Primary Examiner—Galen Barefoot
Attorney, Agent, or Firm—Terry J. Anderson; Robert B. Block

[57] ABSTRACT

A store adapter attachable to an aircraft with minimum modifications for retaining and supporting the store proximate the bomb rack of the aircraft, and for releasing the store by actuation of the bomb rack mechanism which causes release of the store clear of the aircraft.

13 Claims, 6 Drawing Figures

STORE ADAPTER

BACKGROUND OF THE INVENTION

1. Field of the Invention

The present invention relates to adapter type carrier for use on parent bomb racks of aircraft to enable mounting thereon of stores other than those intended to be supported on parent bomb racks, and in particular to aircraft bomb rack adapters which are located between the aircraft's bomb rack and an ordnance or store to obtain a reuseable, non-releasable weapon adapter.

2. Description of the Prior Art

Present day adapters, such as the Centerline Multiple Weapons Adapter Assembly described in U.S.A.F. Technical Order 1-1-22, are bolted or otherwise attached to an ordnance store and, in the event the ordnance store is released in flight, the adapter is carried with it at release.

The present adapter, unlike the prior art adapters, is attached to the aircraft proximate the bomb rack to become an extension thereof. In the event the store has to be released, the bomb rack release mechanism is activated to automatically operate the adapter store retention mechanism allowing the store to be dropped while the adapter remains with the aircraft for subsequent use.

STATEMENT OF THE PRIOR ART

The following patents are cited as the most pertinent prior art patents of which the applicant is aware:

| U.S. Pat. No. | NAME | DATE |
| --- | --- | --- |
| 3,810,671 | P. A. E. Jeffery | May 14, 1974 |
| 3,722,944 | H. S. Dand | March 27, 1973 |

U.S. Pat. No. 3,810,671 to Jeffery, titled "Jettison Device for Helicopter Load Carrying System", relates to a device for jettisoning a load from a helicopter in an emergency situation. The device of Jeffery jettisons its load when a pressure, resulting from an explosive device, actuates a piston operated releasing rod and collar, the movement of which permits a pair of jaws to pivot and release a load. Simultaneously, the pressure generated by the explosive device actuates a piston operating a cable cutter. The piston drives the cutter blade to sever a hook retrieval cable.

U.S. Pat. No. 3,722,944 to Dand relates to store release mechanisms used in pairs so that either mechanism can be moved into store engaging position, and including positive means to prevent one or more mechanisms from being in an inadvertent unlocked store engaging position. The adapter assembly of the present invention differs from the patented mechanism by the structural configuration of the store retaining and releasing components thereof.

The relevance between the above cited patent and the present invention is that each uses one or more pair of jaw-like members to hold and release a given load.

BRIEF SUMMARY OF THE INVENTION

The present invention is related to an adapter which effectively extends an aircraft bomb rack/store interface. The body portion of the adapter is attached to a bomb rack on an aircraft. Thus, the present adapter functions for carrying stores, such as gun pods, launchers, and reconnaissance pods that are not released themselves, except in an emergency.

The basic requirement for adapters on military aircraft is dictated by the inability of the bomb rack to carry the general types of stores because of structural interference and/or clearance requirements. The majority of the several types of bomb racks in use employ hooks that engage lugs which are fitted to the stores. Adjustable pad members are positioned to press against the store to prevent the store from moving relative to the bomb rack under the influence of air loads, inertia loads, and vibration resulting from manuevering of the aircraft.

The present adapter is normally secured to the bomb rack by bolts and/or turnbuckles which replace the adjustable pad members of the bomb rack. Further, the rack employs suspension links, which effectively extend the function of the bomb rack hooks, and allow the adapter to release stores carried thereon by activation of the bomb release mechanism without any modification to the bomb rack or its release system.

An object of the present invention is to effectively lower a bomb rack/store interface affixed to an aircraft.

Another object is to provide a store carrier adapter that derives its release operation entirely from the bomb rack release mechanism of the aircraft.

Yet another object is to provide a store adapter which is held captive by an aircraft without modification to its bomb rack, and which is not ejected if the store is released.

Still another object is to extend the jettison ram of an aircraft bomb rack by a linear motion transmission device contained in the adapter.

Other objects, advantages and novel features of the present invention will become apparent from the following detailed description of the invention when considered in conjunction with the accompanying drawings.

DETAILED DESCRIPTION OF THE INVENTION

The adapter carrier of the present invention is attached releasably to an aircraft proximate the bomb rack thereof by attaching means which effectively lower the rack/store interface below the aircraft. Operation of the adapter to attach thereto or release therefrom a store is derived from the bomb rack mechanism. Only minor modifications of the aircraft and/or the bomb rack thereof are required for installation and use of the adapter on the aircraft. However, by this invention, the store can be supported and transported on the adapter carrier which itself remains with the aircraft and the store released therefrom, the carrier returning with the aircraft for reuse.

Figure 1:
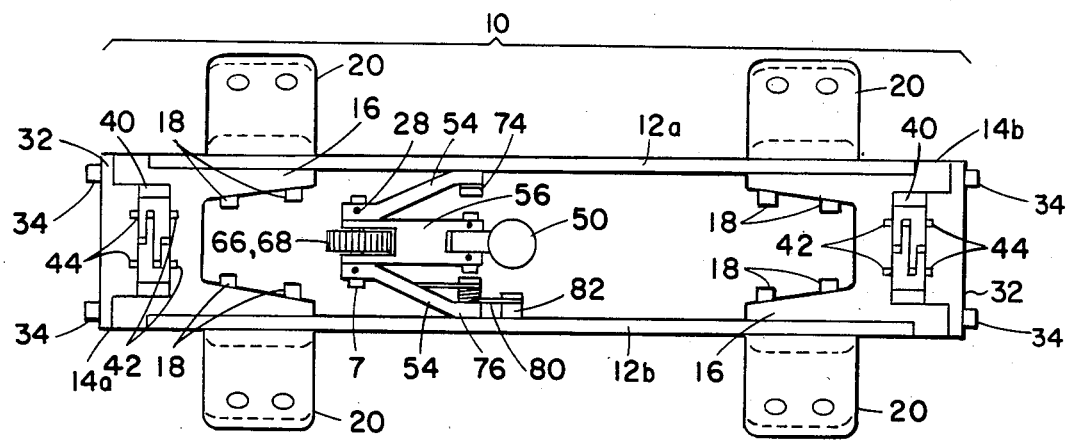
FIG. 1 is a top plan view showing the bomb rack adapter of the present invention in the latched position.
Figure 2:
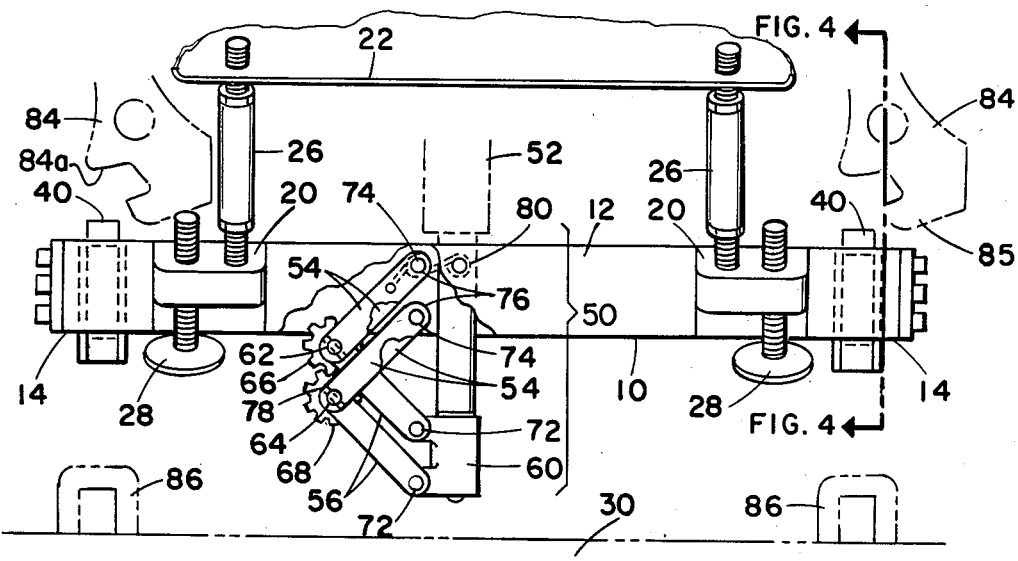
FIG. 2 is an elevational view of the adapter in the stores released position, with parts cut away and parts disclosed in alternate positions.

Referring now to FIG. 1, the adapter 10 comprises a frame or body formed of first and second support plate members 12a,b, which are held together in a spaced relationship by end assemblies 14a,b. Each end assembly 14 comprises a spider 16 through which a plurality of bolts 18 extend to attach plate members 12 thereto. The bolts 18 are threadably received in portions of sway braces 20 which hold the frame components together in an assembled relationship. As shown in FIG. 2, the adapter 10 is installed on a typical aircraft, and attached to the aircraft structure 22 by fixed or adjustable strut means, such the turnbuckles 26 which are attached respectively to each of the sway braces 20. By means of opposed threaded ends on each of the turnbuckles, the frame is attached to the aircraft structure 22 to prevent release of the adapter 10 from the aircraft structure 22 when the store is released. Screw jacks positioned in the sway braces 20 adjust swivel pads 28 against which the stores 30 are positioned to preclude movement thereof relative to the aircraft.

Figure 6:
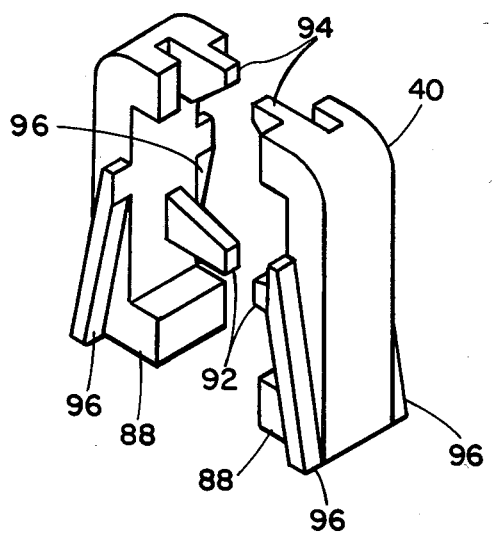
FIG. 6 is an enlarged perspective view of a suspension link of the adapter.

Link mounting means is provided and comprises the spiders 16 and spider cap 32 attached to each spider 16 by a plurality of cap screws 34. These serve to slidably hold and suspend store hanger or link means 40 captive in keyways 42 located in the spider 16, and in opposed slots or keyways 44 located in the spider cap 32. These slots or keyways 42, 44 serve as guides for causing movement of hanger links 40 between store attached (FIG. 3) and store released (FIGA. 2) conditions as the link means moves between a first improved position and a second, lower position in the mounting means. Each link means 40 comprises an opposed pair of link halves 40a, 40b each having two sets of projections 92, 94 directed towards each other in an overlapping relationship (FIG. 6) to define an opening 45 for the aircraft's hook 84 to enter and hold. The sets of projections 92, 94 remain closed i.e., overlapped, during travel between positions, while the jaws open and close to secure or release the load lug.

Figure 3:
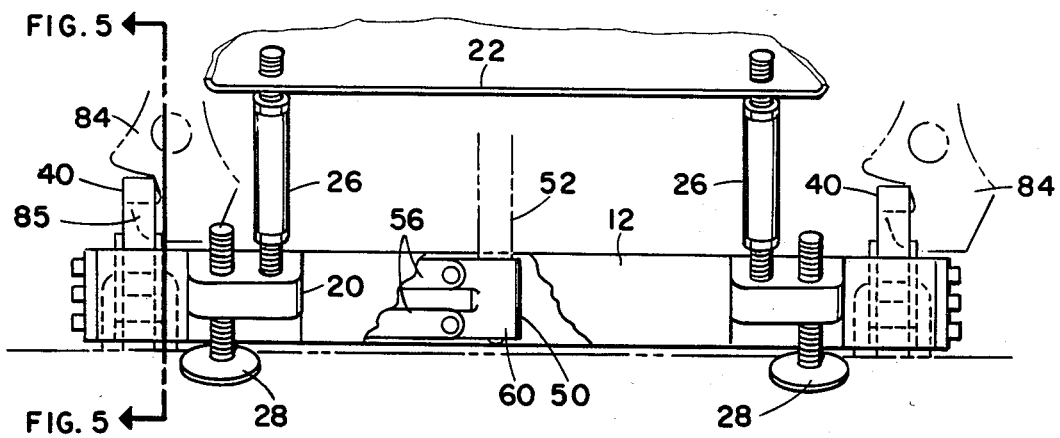
FIG. 3 is an elevational view of the adapter in the latched position.

A store ejector or jettisoning assembly 50 is pivotally mounted on the adapter 10 between the plate members 12 to effectively extend the parent bomb rack jettisoning ram 52 (shown in phantom in FIGS. 2 and 3). The ejector assembly 50 comprises a parallelogram arrangement of arms 54 coupled with links 56, and the auxiliary ejector 60. The arms 54 and links 56 are connected at shafts 62, 64 about which gears 66, 68 are mounted respectively to mesh with one another for causing coordinated movement of the arms 54 and links 56. Ejector head 60 is supported on the links 56 by mounting and connecting hardware, including pins 72 which permit the ejector head to move relative to the ends of the links 56, upon actuation by the ram 52. Other pivot pins 74 mount a first end 76 of each arm 54 respectively to the adjacent one of plates 12a,b to enable the pairs of arms to move together. The arms 54 are pivotably mounted in line, one above the other, and aligned one from the other, as attached to the opposing plate members.

The gears 66, 68 are press fit respectively on shafts 62, 64 which extend through adjacent ends of arms 54 and links 56. The gear shafts 62, 64 are keyed or otherwise fixed as with pins 78 to the ends of the arms 54 and the links 56 to cause rotation of the links 56 with the arms as the arms pivot relative to plates 12.

Gears 66, 68 act together to form a tracking gear set that assures linear travel of the auxiliary ejector head 60 when activated by the ejector ram 52 of the parent bomb rack, as best seen in FIG. 2.

A return means, shown as spring 80, acts between a spring pin 82 and at least one of the arms 54 to maintain the store ejector assembly 50 in retracted position, and to return the ejector assembly to that position after ejection of a store carried thereon.

Figure 5:
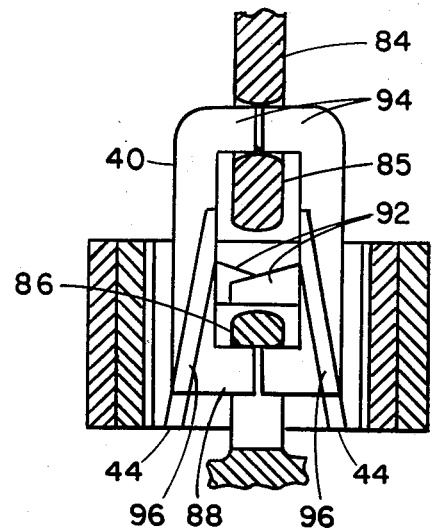
FIG. 5 is a sectional view taken through section line 5—5 of FIG. 3 showing the suspension links in the latched position.

After loading and during transportation of a store, the store 30 is held captive by the combination of the bomb rack of the aircraft, represented by hooks 84, shown in phantom, and the adapter carrier 10. The hooks 84 are displaceable between store attaching position as shown in FIG. 2, and store released position as shown in FIG. 3 by being released under the control of the craft, and, in the reverse, by being pushed up at cam on loading surface 84a by the load lug (in normal service), or, by the link means 40 (in this invention). The suspension lugs 86 of the store 30 (shown in phantom) are releasably held by the hooks 84, and between the lower ends or retainers 88 and the hanger actuators 92 on the hangers 40 (best seen in FIG. 6). After a store is loaded into position on the adapter, the hangers 40 are actuated into closed position (best seen in FIG. 5) by the bomb rack hooks 84 which are positioned between the upper ends 94 of the hangers and the hanger actuators 92.

Figure 4:
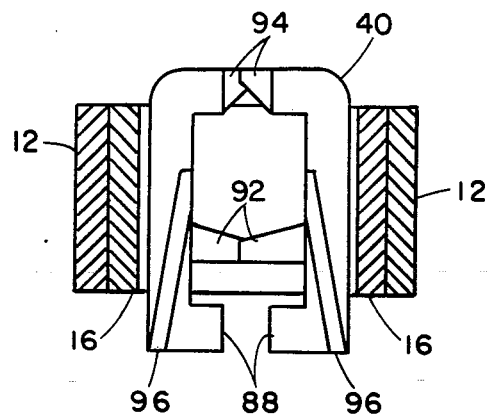
FIG. 4 is a sectional view taken along section line 4—4 of FIG. 2 showing the suspension links of the present invention in the unlatched or stores released position.

In loading the store 30 to the adapter 10, the hooks 84 of the bomb rack are placed in the store released position (best seen in FIG. 2), and the store 30 is raised into engagement with the adapter. As the store is urged into its attached position, the suspension lugs 86 contact the hanger actuators 92 (best seen in FIGS. 4–6), which in turn urge the hangers 40 upwardly. As the hangers move upwardly, ramps 96, fixed on each side of the hangers 40 to maintain alignment thereof, slide in the spider keyways 42 and the spider cap keyways 44. This action causes the hanger links to close as they are urged upward thereby causing the jaws 88 to automatically close, and to activate the hooks 84 from open positions to closed positions. The bomb rack hooks 84 are enclosed between the tangs 94 and the hanger actuators 92.

The ramps 96 are angled relative to the path along which a store would move upon being attached or released. That is, as the suspension lugs 86 on a store 30 are moved upwardly for attaching of the store, the lugs engage the bottom of hanger actuator 92 lifting the hangers 40. The hanger portions come together as the ramps 96 are guided in guide grooves 42, 44 causing the stores suspension lugs 86 to be captured over the shelf formed by the inwardly directed retainer ends 88 of the hangers 40. Simultaneously, as the hanger rises, the retainer ends 88, the tangs 92, and the upper portions 94 of the hangers 40 come together to form a hanger portion with an opening in which the hook 84 is positioned.

When the store 30 is in its stored position, the hooks 84 are closed to releasably maintain the store attached to the active adapter 10. Swivel pad assemblies, which are threadably adjustable through the sway braces 20, are then adjusted to engage the store 30 to firmly position the same in relation to the adapter 10.

Upon releasing of a store 30 from the adapter 10, the hangers 40 are caused to separate, and permit the lugs 86 of the store to move clear of the links. When stored, the hooks 84 are raised by the hooks portions 85 passing through the hangers 40 below upper portions 94. Upon removal of hook portions 85 from the hangers, the weight of the store pulls the hangers 40 downwardly, and causes the slanted guide grooves 42, 44 in which the ramps 96 function, to cause the hangers 40 to separate. As the ejector system completes its function, the ends 88 of the hangers are fully separated to be clear for the movement of the suspension lugs 86 away from the hangers. Thus, the store 30 is released, and can be dropped clear of the aircraft by gravity. The auxiliary store jettisoning device 50 ensures that the store is dropped clear of the aircraft.

The invention has been described in language more or less specific as to structural features. However, it is to be understood that the means and construction herein disclosed comprise a preferred embodiment of putting the invention into effect in any of its forms or modifications within the scope of the appended claims.

I claim:

1. A carrier for releasably suspending a load from a hook of a vehicle by a lug attached to the load comprising a suspension link means having a hook engageable first end and a set of openable jaws for gripping the lug at the other end, means for mounting said link means for movement toward and away from the hook between a first position in which the first end of the link means is engaged by the hook and the jaws are closed to capture and support the load by its lug, and a second position in which the link means is free of the hook and the jaws open to release the load, said mounting means supporting said link means throughout its range of travel between said positions, means associated with said link means and said mounting means for positively moving said jaws between jaws open and jaws closed positions as the link means moves between the first and second positions in the mounting means, said link means comprising an opposed pair of link halves each having two sets of projections directed towards each other in an overlapping relationship and spaced apart to define an opening for the hook at said first end, said link means bounded at the hook end by a set of projections which remain closed during travel between positions while the jaws open and close, one set of projections at the first end being adapted to engage the hook to move the same from open to closed position to engage the link means through said opening, the other set of projections being adapted to receive lug movement to push the link means into first position.

2. The carrier as in claim 1 further in which the means for moving the link means comprises cam and follower means, one of said cam and follower means being formed on the mounting means and the other of the cam and follower means being formed on the links, said follower means being constructed and arranged for moving the jaws of the links apart as the links move away from the hook and to the second position.

3. The carrier as in claim 2 in which the cam and follower means comprises cam guideways formed on the mounting means and follower keys formed on the links for movement along said guideways.

4. The carrier as in claim 3 in which said cam guideway comprises slots diverging from the path of link movement toward said second portion, and key projection means on said link halves running in said slots whereby linear movement of the link means as a whole between the positions opens and closes the jaws.

5. The carrier as in claim 1 in which said hook is mounted for rotation about an axis off-center to said line of movement of said link means and provided with a bearing surface adapted to be contacted by either the lug or hook end of said link whereby stores can be loaded into said carrier with the same motion as was used without said carrier.

6. The carrier as in claim 5 wherein link means is aligned with respect to the hook in the same manner as the lug is aligned when said carrier is not in place so that said link means directly replaces the lug and engages the hook.

7. The carrier as in claim 1 in which said vehicle has a load jettisoning ram, and further including extension ram means, means for supporting the extension ram means for linear motion toward and away from said load in alignment with said vehicle jettisoning ram.

8. A carrier for releasably suspending a load from a hook of a vehicle by a lug attached to the load comprising frame means adapted to be attached to the vehicle proximate the hook for retention with the vehicle, a suspension link means having a hook engageable first end and a set of openable jaws for gripping the lug at the other end, means carried in said frame for mounting said link means for movement toward and away from the hook between a first position in which the first end of the link means is engaged by the hook and the jaws are closed to capture and support the load by its lug, and a second position in which the link means is free of the hook and the jaws open to release the load, said mounting means supporting said link means throughout its range of travel between said positions, and means associated with said link means and said mounting means for positively moving said jaws between jaws open and jaws closed positions as the link means moves between the first and second positions in the mounting means, said link means comprising an opposed pair of link halves each having two sets of projections directed towards each other in an overlapping relationship and spaced apart to define an opening for the hook at said first end, said link means bounded at the hook end by a set of projections which remain closed during travel between positions while the jaws open and close, one set of projections at the first end being adapted to engage the hook to move the same from open to closed position to engage the link means through said opening, the other set of projections being adapted to receive lug movement to push the link means into said first position.

9. The carrier as in claim 8 further in which the means for moving the links comprises cam and follower means, one of said cam and follower means being formed in the mounting means and the other of the cam and follower means being formed on the links, said follower means being constructed and arranged for moving the jaws of the links apart as the links move away from the hook and to the second position.

10. The carrier as in claim 9 in which the cam and follower means comprises cam guideways formed on the mounting means and follower keys formed on the links for movement along said guideways.

11. The carrier as in claim 8 in which said frame comprises a pair of spaced, parallel support plate members and in which each said mounting means comprises a pair of spaced spider assemblies mounted on said plate members, and said link means comprise a pair of link sets mounted in said assemblies.

12. The carrier as in claim 10 in which said cam guideway comprises slots diverging from the path of link movement toward said second portion, and key projection means on said link halves running in said slots whereby linear movement of the link means as a whole between the positions opens and closes the jaws.

13. An adapter for use as a non-releasable attachment to a vehicle to cooperate with a permanently mounted parent stores rack and stores release hook for releasably suspending stores different from those originally intended to be supported in said parent stores rack, said stores having at least one suspension lug, said adapter comprising a frame, means for attaching the frame to the vehicle independently of said release hook and proximate to the permanent stores rack and hook for non-releasable retention with the vehicle, said frame including means for at least partially supporting the new stores, means forming at least one link hanger having a hook engageable first end and a set of openable jaws for capturing said lug at the other end, guide means carried in said frame for mounting said link hanger for movement toward and away from said hook and including means for positively opening said jaws as said hanger moves away from the hook and for positively closing the jaws as said hanger moves toward the hook so that said guide means establishes a first position in which the first end of the link hanger is engaged by the hook with the jaws closed by the guide means to capture and support the load by its lug, and a second position, after being disengaged by the hook and falling away therefrom, in which the jaws are opened by the guide means to release the load, said guide means supporting said link means throughout its range of travel between said positions, said link hanger further including a lug engageable actuating means intermediate said ends, said jaws and actuating means being so constructed and arranged that, when the hanger is free of the hook and in the open position the stores lug can be pushed through the jaws to engage the actuating means and further pushed to carry the hanger to the closed position whereat the lug is captured by the jaws and the hanger engaged by the hook, said guide means thereby establishing said first and second positions to simulate the same operational loading movement for engagement of the load lug as was present in the original store rack operation and further extend the function of the vehicle stores rack and hook through the adapter frame to release stores carried thereon by activation of the hook without modification thereof.

* * * * *